United States Patent
Park

(10) Patent No.: US 9,359,199 B2
(45) Date of Patent: Jun. 7, 2016

(54) APPARATUS FOR GENERATING HYDROGEN GAS USING COMPOSITION FOR GENERATING HYDROGEN GAS AND COMPOSITION FOR GENERATING HYDROGEN GAS

(76) Inventor: Jung-Tae Park, Jeollabukdo (KR)

(*) Notice: Subject to any disclaimer, the term of this patent is extended or adjusted under 35 U.S.C. 154(b) by 941 days.

(21) Appl. No.: 12/515,896

(22) PCT Filed: Mar. 10, 2008

(86) PCT No.: PCT/KR2008/001357
§ 371 (c)(1),
(2), (4) Date: Sep. 9, 2009

(87) PCT Pub. No.: WO2008/114951
PCT Pub. Date: Sep. 25, 2008

(65) Prior Publication Data
US 2010/0028216 A1  Feb. 4, 2010

(30) Foreign Application Priority Data

Mar. 20, 2007 (KR) .................. 10-2007-0027363
Apr. 19, 2007 (KR) .................. 10-2007-0038219

(51) Int. Cl.
| | | |
|---|---|---|
| B01J 7/00 | (2006.01) | |
| C01B 3/36 | (2006.01) | |
| C01B 6/24 | (2006.01) | |
| C01B 3/02 | (2006.01) | |
| C01B 3/06 | (2006.01) | |

(52) U.S. Cl.
CPC ...................... C01B 3/061 (2013.01)

(58) Field of Classification Search
USPC ........... 423/658, 658.2, 647, 648.1, 627, 625, 423/635, 644, 657; 48/61, 62
See application file for complete search history.

(56) References Cited

U.S. PATENT DOCUMENTS

| | | | |
|---|---|---|---|
| 5,372,617 A | 12/1994 | Kerrebrock et al. | |
| 6,899,862 B2 | 5/2005 | Baldwin et al. | |
| 7,282,073 B2 * | 10/2007 | Petillo et al. ................ | 48/61 |
| 7,648,786 B2 * | 1/2010 | Shurtleff et al. ............ | 429/421 |
| 2002/0025462 A1 * | 2/2002 | Nakanishi et al. .......... | 429/19 |
| 2004/0016769 A1 * | 1/2004 | Redmond .................... | 222/3 |
| 2007/0020174 A1 | 1/2007 | Xu et al. | |
| 2007/0084879 A1 * | 4/2007 | McLean et al. ............ | 222/3 |
| 2009/0035214 A1 * | 2/2009 | Goble et al. ................ | 423/657 |

FOREIGN PATENT DOCUMENTS

| | | |
|---|---|---|
| EP | 0417279 A1 | 3/1991 |
| EP | 1006078 A1 | 6/2000 |

(Continued)

OTHER PUBLICATIONS

Capes et al., "Ore Separation in a Packed-Fluidized Bed", Industrial & Engineering Chemical Process Design and Development, vol. 5, No. 3, pp. 330-336, 1966.

*Primary Examiner* — Matthew Merkling
(74) *Attorney, Agent, or Firm* — The Webb Law Firm

(57) ABSTRACT

The present invention relates to an apparatus for generating hydrogen gas using a composition for generating hydrogen gas, which generates hydrogen gas ($H_2$) from water ($H_2O$) through spontaneous thermochemical reaction without supplying electricity using a composition for generating hydrogen gas which generates the hydrogen gas by spontaneous oxidation with water at room temperature.

12 Claims, 6 Drawing Sheets

(56) References Cited

FOREIGN PATENT DOCUMENTS

| | | |
|---|---|---|
| EP | 1170249 A1 | 1/2002 |
| EP | 1757557 A1 | 2/2007 |
| JP | 16231466 A | 8/2004 |
| JP | 2004231466 A | 8/2004 |
| JP | 18335603 A | 12/2006 |
| JP | 2006335603 A | 12/2006 |
| KR | 1994-25939 A | 12/1994 |
| KR | 1020010012538 A | 2/2001 |
| KR | 100566966 B1 | 3/2006 |
| KR | 100640681 B1 | 10/2006 |
| WO | 2006025511 A1 | 3/2006 |

* cited by examiner

APPARATUS FOR GENERATING HYDROGEN GAS USING COMPOSITION FOR GENERATING HYDROGEN GAS AND COMPOSITION FOR GENERATING HYDROGEN GAS

TECHNICAL FIELD

The present invention relates to an apparatus for generating hydrogen gas using a composition for generating hydrogen gas, which generates hydrogen gas ($H_2$) from water ($H_2O$) through spontaneous thermochemical reaction without supplying electricity using a composition for generating hydrogen gas which generates the hydrogen gas by spontaneous oxidation with water at room temperature.

Also, the present invention relates to a composition which generates hydrogen gas by contact with water at room temperature.

BACKGROUND ART

Hydrogen is a colorless, tasteless, odorless, flammable and non-corrosive gas with strong diffusivity and reducibility and is the lightest gas. The hydrogen has an atomic number 1 in the periodic table of elements and exists as gaseous molecule. Also, the hydrogen has a diffusion speed faster 14 times than that of air. Therefore, the hydrogen saturates unsaturated bonds of organic compounds due to its superior diffusivity and reducibility and is used in various fields such as electronics, chemistry, metals, glasses, foods, oils and fats and the like using the characteristic. Further, the hydrogen is used as fuel for a fuel cell and is also used as a heat source by reacting with catalysts such as platinum, palladium and the like at room temperature. When the hydrogen reacts with the catalyst, the hydrogen is characterized in that it generates higher calorie than when it burns. Further, since the hydrogen, which is present in an amount of 0.018 g per 1 Kg of seawater and is the most abundant of chemical elements, is an energy source most suitable for the future energy system and is an energy medium which can maintain the current system together with electric energy and thus can be utilized as an infinite resource, the hydrogen can solve the problems of energy and environmental pollution as a clean energy of the future and thus is in the limelight as an alternative energy. Particularly, the hydrogen has advantages that it generates no pollutants except for minimum amount of nitrogen oxide ($NO_x$) when used as fuel and it can be conveniently used as a fuel for direct combustion or a fuel for the fuel cell and the non-combustion catalyst.

The present inventor has invented a heat source apparatus by a non-combustive and non-ignitable catalyst using the hydrogen having the aforementioned advantages as a fuel and was granted patents thereto as Korean Patent Nos. 10-0566966 and 10-0640681.

Due to such utilization of the hydrogen, many studies have been undergone to produce the hydrogen. In recent, generation of the hydrogen from methanol, city gas, biogas and the like by using a hydrogen reformer is utilized. However, such method has disadvantages that the price and the developing cost of the hydrogen reformer are high it is necessary to supply power at the time of initial operation.

Besides, a method for producing the hydrogen and high quality carbon product without discharge of carbon dioxide ($CO_2$) by exciting natural gas to a plasma state and a thermochemical hydrogen generating method that generates the hydrogen at low temperature by a chemical cycle consisting of endothermic and exothermic reactions (I&EC Process Design and Development, 5 (1966) 336.) are utilized. However, these are suitable for mass production of the hydrogen due to their complicated equipments.

In recent, as domestic or portable fuel cell and heat source apparatus which use the hydrogen as a fuel are developed, there is a requirement for a method that generates the hydrogen conveniently and quickly. A method for generating the hydrogen using hydride compounds such as sodium borohydride ($NaBH_4$), lithium hydride (LiH), magnesium hydride ($MgH_2$) and the like has an advantage that it can generate the hydrogen simply by supplying water, but it is not suitable for the hydrogen production in consideration of the economy since the hydride compounds are of high price.

Korean patent No. 0522964 discloses, as a hydrogen gas generating method, a method for separating hydrogen from vapor molecule or water molecule by contacting steam or water to a silica-alumina composite oxide at a temperature of less than 300 to 600° C. This method is characterized in that it generates the hydrogen gas by dissociation and recombination of protons due to catalytic action of the silica-alumina composite oxide according to an action of solid acid. That is to say, in this method, the hydrogen is produced by heating pure water, i.e. distilled water to more than 80° C. and supplying the water or vapor to a reaction vessel filed with zeolite as the silica-alumina composite oxide. Korean patent laid open No. 1994-25939 discloses a method for manufacturing a safe hydrogen generator using aluminum powder. In the manufacturing method, the hydrogen gas is generated by injecting water into a mixture composition of aluminum powder used as a foaming agent or dried aluminum powder in which each particle of the aluminum powder is coated with a soluble reaction inhibitor such as sodium metaphosphate and dried powder of strong alkali in which each particle of mineral powder such as calcium hydroxide or diatomite is coated with strong alkali material such as sodium hydroxide. However, the production cost is increased since the composition for generating the hydrogen gas which has been subject to complex processes such as coating the mineral and the like should be used for proceeding of safe reaction for the hydrogen gas generation and a safety hazard arises when overheated since the reaction speed cannot be substantially controlled. Also, the purity of the generated hydrogen gas is low and particularly an explosion may occur due to mixing with oxygen. Therefore, this method could not be put to practical use.

DISCLOSURE

Technical Problem

An object of the present invention is to provide an apparatus for generating high purity hydrogen with simple structure, another object of the present invention is to provide a safe apparatus for generating hydrogen which can generates the hydrogen alone by spontaneous thermochemical reaction without supplying electricity and thus can be utilized to a portable or fixed hydrogen fuel cell, a non-ignitable catalyst heater using the hydrogen or a non-ignitable hydrogen boiler, and further another object of the present invention is to provide an inexpensive composition for generating hydrogen which can be employed to the apparatus for generating high purity hydrogen according to the present invention.

Technical Solution

According to an aspect of the present invention, the apparatus for generating hydrogen gas using a composition for generating hydrogen gas includes: a reaction vessel which receives a composition for generating hydrogen gas by contacting with water at room temperature and is provided with a heat exchange coil for recovering reaction heat; a water supplying part provided with a sprayer for spraying water to the composition for generating hydrogen gas within the reaction vessel; a hydrogen purifying part for purifying the hydrogen gas generated from the reaction vessel; and a hydrogen storing part for storing the hydrogen gas pressurized by a hydrogen gas pressurizing part In the present invention, the hydrogen is instantaneously generated as soon as the water is added to the composition for generating hydrogen gas. Therefore, in order to prevent a safety hazard due to rapid increase in temperature within the reaction vessel, it is preferable that a temperature sensor is provided within the reaction vessel and a control part for controlling amount of water supplied to the heat exchange coil in response to a temperature inputted into the temperature sensor, thereby maintaining temperature within the reaction vessel to a proper reaction temperature and thus controlling hydrogen gas generation speed, previously preventing the safety hazard due to the excessive generation of the hydrogen and recycling heat recovered from the reaction heat. Also, it is preferable to controllably maintain the temperature of the reaction vessel to 30-150° C. in consideration of the hydrogen generation speed and stability.

In the present invention, the composition for generating hydrogen gas reacts instantaneously and rapidly with the water as soon as the water is added thereto and thus vapor and hydrogen ($H_2$) gas are generated in mixed state. Therefore, in order to remove impurities such as vapor and oxygen from the generated hydrogen gas and thus obtain high purity hydrogen gas, the hydrogen gas purifying part passes through at least one selected from a water remover, an oxygen remover and a hydrogen gas drier.

In order to produce high purity hydrogen gas, it is preferable to remove air including oxygen which is present within components of the apparatus for generating hydrogen gas according to the present invention, such as the reaction vessel, hydrogen storing part, etc. To this end, it is preferable that a vacuum pump is provided and the vacuum level within the apparatus is maintained to about $10^{-3}$-$10^{-7}$ Torr.

In order to store the highly purified hydrogen gas, the hydrogen gas pressuring part is provided between the hydrogen gas purifying part and the hydrogen gas storing part, and the hydrogen gas pressuring part may be provided with a diaphragm pump or a vacuum pump.

Meanwhile, in the present invention, the composition for generating hydrogen gas includes 40-70 weight % of calcium oxide (CaO) powder; 2-20 weight % of calcium chloride ($CaCl_2$), magnesium chloride ($MgCl_2$) or sodium bicarbonate ($NaHCO_3$) powder; 6.7-30 weight % of aluminum or alumina ($Al_2O_3$) powder; and 0.001-10 weight % of iron or magnesium powder. Alumina of the alumina powder may be a spherical, flat or fibrous porous alumina prepared from sol-gel reaction, the calcium chloride may be an anhydride, and the calcium oxide (CaO) has a purity of 95-100 weight %. Also, porous alumina powder containing 0.01-0.03 weight % of iron as the alumina ($Al_2O_3$) powder and iron powder.

Alternatively, in the present invention, the composition for generating hydrogen gas includes 80-150 parts by weight of at least one powder selected from calcium oxide powder and dolomite powder and 5-20 parts by weight of sodium hydroxide powder based on 100 parts by weight of at least one powder selected, including aluminum powder, from aluminum powder, magnesium powder and iron powder, and may further include 0.1-5 parts by weight of sodium chloride (NaCl) powder based on 100 parts by weight of at least one powder selected, including aluminum powder, from aluminum powder, magnesium powder and iron powder.

According to another aspect of the present invention, the composition for generating hydrogen gas includes 40-70 weight % of calcium oxide (CaO) powder; 2-20 weight % of calcium chloride ($CaCl_2$), magnesium chloride ($MgCl_2$) or sodium bicarbonate ($NaHCO_3$) powder; 6.7-30 weight % of aluminum or alumina ($Al_2O_3$) powder; and 0.001-10 weight % of iron or magnesium powder, and alumina of the alumina powder may be a spherical, flat or fibrous porous alumina prepared from sol-gel reaction.

Alternatively, the composition for generating hydrogen gas includes 80-150 parts by weight of at least one powder selected from calcium oxide powder and dolomite powder and 5-20 parts by weight of sodium hydroxide powder based on 100 parts by weight of at least one powder selected, including aluminum powder, from aluminum powder, magnesium powder and iron powder, and may further include 0.1-5 parts by weight of sodium chloride (NaCl) powder based on 100 parts by weight of at least one powder selected, including aluminum powder, from aluminum powder, magnesium powder and iron powder.

Advantageous Effects

According to the present invention, since a composition for generating for hydrogen gas which generates hydrogen gas by spontaneous oxidation reaction with water at room temperature is used, it is possible to generate instantaneously high purity hydrogen gad by adding water to the composition at room temperature. Also, since the heat exchange coil is provided, reaction temperature within the reaction vessel can be constantly controlled and thus it is possible to generate safely and constantly the hydrogen gas as well as recover the reaction heat generated when the hydrogen gas is generated. Further, since it is possible to generate hydrogen alone by spontaneous thermochemical reaction without supplying electricity, it is possible to realize portable and fixed hydrogen generators. Further, since production cost can be reduced compared with conventional hydrogen gas generation method, it is possible to utilize to a non-ignitable catalyst heater using the hydrogen or a non-ignitable hydrogen boiler. Furthermore, it is an effective solution for reducing emission of greenhouse gases as one of alternative energies. In addition, in relation to the field of a fuel cell, it is be expected to be utilized as a hydrogen supplying apparatus for small, medium and large fuel cells by using hydrogen as fuel.

DESCRIPTION OF DRAWINGS

The above and other objects, features and advantages of the present invention will become apparent from the following description of preferred embodiments given in conjunction with the accompanying drawings, in which.

BEST MODE

Figure 1:
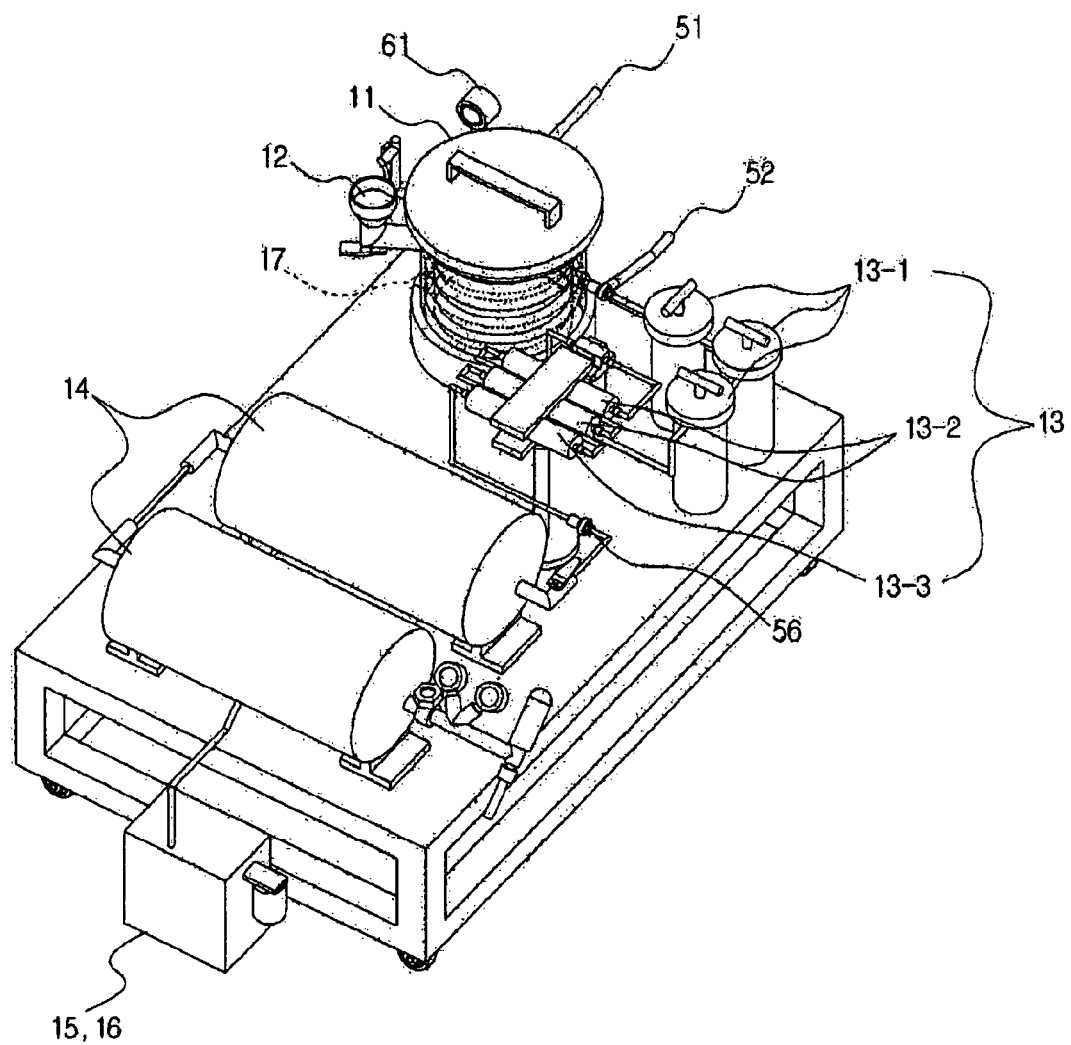
FIG. 1 is a perspective view illustrating an apparatus for generating hydrogen according to an embodiment of the present invention.

At first, an example of a composition for generating hydrogen gas according to the present invention will be described in detail.

Composition 1 for Generating Hydrogen Gas

Composition 1 for generating hydrogen gas includes 40-70 weight % of calcium oxide (CaO) powder; 2-20 weight % of calcium chloride ($CaCl_2$), magnesium chloride ($MgCl_2$) or sodium bicarbonate ($NaHCO_3$) powder; 6.7-30 weight % of aluminum or alumina ($Al_2O_3$) powder; and 0.001-10 weight % of iron or magnesium powder.

The present invention relates to an apparatus for generating hydrogen gas using the calcium oxide (CaO) which is abundant on earth, and the composition 1 is a composition for generating the hydrogen gas using neutralization reaction and hydration reaction by supplying water to the calcium oxide and includes hydrogen and calcium hydroxide ($Ca(OH)_2$) as final products. The calcium hydroxide ($Ca(OH)_2$), one of the final products, has an advantage that it is environment friendly.

The composition 1 for generating hydrogen gas is based on reaction formula in which the calcium oxide thermochemically reacts with water ($H_2O$) to generate the hydrogen gas and the basic formula can be represented as follows:

$$CaO(s) + 2H_2O(l) \rightarrow Ca(OH)_2 + H_2(g)\uparrow \quad (1)$$

Meanwhile, in the process of thermochemical reaction of calcium with water ($H_2O$) in the reaction of above (1), there are problems that the reaction does not starts early unless the temperature of the reaction system is high and thus the water is in vapor state and the reaction speed, i.e. the speed of generating the hydrogen is very slow. Particularly, since it is difficult that the water infiltrates into the inside of the calcium oxide as calcium hydroxide having low water solubility is generated on surface of the calcium oxide powder, it is difficult to sufficiently generate the hydrogen gas from the calcium oxide.

To overcome the above problems, the composition 1 for generating the hydrogen gas includes calcium chloride which is an anhydride, magnesium chloride or sodium bicarbonate. If water is added to the composition 1, the calcium oxide is converted to the hydrogen gas and the calcium hydroxide by reaction of the water with the calcium oxide, and at the same time, the temperature of the composition itself is increased by hydration heat generated in the process of the hydration of the anhydride and thus the water added to the composition 1 is vaporized to be converted to the vapor. Therefore, reactivity of the water with the calcium oxide is more raised and thus the speed of generating the hydrogen is increased and most of the calcium oxide can be converted to the hydrogen gas and the calcium hydroxide. At this time, the hydrated calcium chloride can absorb the water again as some water escape again gradually in exothermic process.

$$CaCl_2 + nH_2O(l) \rightarrow CaCl_2(s).nH_2O + \Delta H \text{ (Heat generation)} \quad (2)$$

$$CaO(s) + 2H_2O(g) \rightarrow Ca(OH)_2 + H2(g)\uparrow \quad (3)$$

Preferably, the calcium oxide (quicklime, CaO) used for the composition 1 for generating hydrogen gas has a size of 40-325 mesh and a purity of more than 95 weight %.

Meanwhile, the composition for generating hydrogen gas contains aluminum or alumina ($Al_2O_3$) powder and iron or magnesium powder as reaction accelerators for accelerating the reaction in that the calcium oxide is reacted with the water to generate the hydrogen gas and the calcium hydroxide.

The aluminum or alumina ($Al_2O_3$) powder prevents the quicklime from being quickly converted into the $Ca(OH)_2$ using its property that it has low viscosity when in contact with the water and allow the calcium oxide to be fully reacted, thereby helping the efficient generation of the hydrogen gas. Also, the iron or magnesium powder raises reaction efficiency and reaction speed by causing the spontaneous thermochemical reaction for generating the hydrogen gas to be arose not in multi-step thermochemical cycles but in one-step thermochemical cycle.

Preferably, the alumina is a spherical, flat or fibrous porous alumina prepared from sol-gel reaction. The property of the used aluminum or alumina ($Al_2O_3$) powder acts as a catalyst in the process of the spontaneous reaction by addition of the aluminum or iron and magnesium powders when the quicklime is reacted to generate the hydrogen gas ($H_2$)

Meanwhile, in relation to the above reaction accelerator, porous alumina (product name: Cataloid-AP) may be employed as the alumina ($Al_2O_3$) powder and the iron powder. The Cataloid is two kinds of ceramic powders mainly containing $Al_2O_3$ or $SiO_2$ and $Na_2O$ and is a material which is used as an alumina or silica colloidal solution by being dispersed in water and thus becomes active alumina or silica. The Cataloid-AP used in the present invention has a particle size of 40-60 nm, contains 67-75 weight % of $Al_2O_3$ and 0.01-0.03 weight % of Fe and is acidic with a pH of about 4.3-5. The Cataloid is a hydrophilic and stable spherical porous ceramic of micro capsule or nano capsule form and is prepared using sol-gel reaction. When in contact with water, it absorbs water in the form of the capsule and then slowly releases the water. Also, the Cataloid shows neutralization effect in reaction with the calcium oxide. Particularly, the Cataloid has a property of superior absorbing amount for water soluble third component since the Cataloid has large specific surface area and micropore volume, and prevents the quicklime from being quickly converted into the calcium hydroxide using its property that it has low viscosity when in contact with the water and aids the calcium oxide to be fully reacted.

With respect to the hydrogen gas generation amount of the composition 1 for generating hydrogen gas, 56 g of the calcium oxide (CaO) and 2 mole, i.e. 36 g of water ($H_2O$) are reacted to generate 2 g of hydrogen gas ($H_2$). The volume of 2 g of hydrogen gas is 22.4 l at temperature of 0° C. and 1 atm (normal state) and thus 35.7 g (about 400 l) of hydrogen gas is generated from 1 Kg of the calcium oxide. Since the price of the calcium oxide is low, it is possible to easily produce the hydrogen gas ($H_2$) by spontaneous thermochemical reaction.

Composition 2 for Generating Hydrogen Gas

Composition 2 for generating hydrogen gas includes 80-150 parts by weight of at least one powder selected from calcium oxide powder and dolomite powder and 5-20 parts by weight of sodium hydroxide powder based on 100 parts by weight of at least one powder selected, including aluminum powder, from aluminum powder, magnesium powder and iron powder.

The composition 2 for generating hydrogen gas generates the hydrogen gas not by heating water or raising temperature to high, but by a spontaneous chemical reaction with water at room temperature without supplying electricity. The hydrogen gas is generated more economically, simply and safely by one-step spontaneous catalytic reaction and oxygen reacts with metal or metal oxide to be converted to a hydroxide.

The composition 2 for generating hydrogen is base on the one-step spontaneous catalytic reaction, which is as following reaction formula (1).

$$CaO+2Al+2NaOH+7H_2O \rightarrow 2[Al(OH)_4]^-(aq)+3H_2(g)+\Delta H \quad (1)$$

Chemical property of the aluminum is amphoteric and thus the aluminum reacts with both acid and alkali. Therefore, a reaction formula with respect to aluminum (Al) alone is as follows:

$$2Al(s)+6H^+(aq) \rightarrow 2Al^{3+}(aq)+3H_2(g) \quad (2)$$

$$2Al(s)+2OH^-(aq)+6H_2O(l) \rightarrow 2[Al(OH)_4]^-(aq)+3H_2(g) \quad (3)$$

Hydrolytic reaction in the above reaction formulas (2) and (3) is as following reaction formulas (4) and (5).

$$[Al(OH_2)_6]^{3+}(aq)+H_2O(l) \leftrightarrow [Al(OH_2)_5(OH)]^{2+}(aq)+H_3O^+(aq) \quad (4)$$

$$[Al(OH_2)_4(OH)_2]^+(aq)+H_3O^+(aq) \leftrightarrow [Al(OH_2)_4(OH)_2]^+(aq)+H_3O^+(aq) \quad (5)$$

The solution in the reaction formulas (4) and (5) is an acidic solution of which acid dissociation constant is similar to that of acetic acid. If the aluminum (Al) reacts with hydroxyl ion, the aluminum is changed from aluminum hydroxide to aluminate ion.

$$[Al(OH_2)_6]^{3+}(aq) \rightarrow Al(OH)_3(s) \rightarrow [Al(OH)_4]^-(aq) \quad (6)$$

Therefore, the aluminum (Al) is dissolved into water only in acidic or alkaline state and exothermically reacts. Using this property, method and apparatus capable of mass producing the hydrogen gas in a short time were invented. The hydrogen is generated in an alkaline state by mixture composition of calcium oxide (CaO) and aluminum (Al). Theoretically, the calcium oxide (CaO) reacts with water as following reaction formula (7) to generate the hydrogen gas.

$$CaO+2H_2O \rightarrow Ca(OH)_2+H_2(g)+\Delta H \quad (7)$$

However, the reaction for generating hydrogen gas according to the reaction formula (7) does not occur at room temperature and is slightly proceeded only when an acid or an alkali is added thereto. In this state, the hydrogen is generated only by promoting the reaction by way of heating the reaction system to a high temperature of more than 800K in a sealed state. However, the composition 2 for generating hydrogen gas can generate the hydrogen gas immediately by adding water even at the room temperature.

The composition 2 for generating hydrogen gas includes, as a preferable composition which generates safely and continuously the hydrogen gas at the room temperature, 80-150 parts by weight of calcium oxide powder and 5-20 parts by weight of sodium hydroxide based on 100 parts by weight of aluminum powder. When the calcium oxide is less than 80 parts by weight based on 100 parts by weight of aluminum powder, it is difficult to control reaction speed of the hydrogen generation reaction. On the contrary, when the calcium oxide is more than 80 parts by weight based on 100 parts by weight of aluminum powder, the reaction speed is excessively slowed down. Also, when the amount of less than 5 parts by weight, the hydrogen gas is not be sufficiently generated. On the contrary, when the amount of more than 20 parts by weight, it is difficult to control the hydrogen gas generation speed.

Meanwhile, in the composition 2 for generating hydrogen gas, some of the aluminum powder may be substituted by the same weight of at least one powder selected from magnesium powder and iron powder. This is based on the fact that the action of the magnesium and iron is similar to the aluminum.

Also, in the composition 2 for generating hydrogen gas, some or all of the calcium oxide powder may be substituted by the same weight of dolomite powder. This is based on the fact that the action of the dolomite which contributes the chemical reaction is similar to the calcium oxide.

To effectively initialize the reaction at low temperature in winter, the composition for generating hydrogen gas may further includes 0.1-5 parts by weight of sodium chloride (NaCl) powder in addition to 80-150 parts by weight of at least one powder selected from calcium oxide powder and dolomite powder and 5-20 parts by weight of sodium hydroxide powder based on 100 parts by weight of at least one powder selected, including aluminum powder, from aluminum powder, magnesium powder and iron powder.

Hereinafter, an apparatus for generating hydrogen gas according to an embodiment of the present invention using the compositions 1 and 2 for generating hydrogen gas described above and other compositions for generating hydrogen gas which generates hydrogen gas by spontaneous oxidation in contact with water at room temperature will be described in detail.

Figure 2:
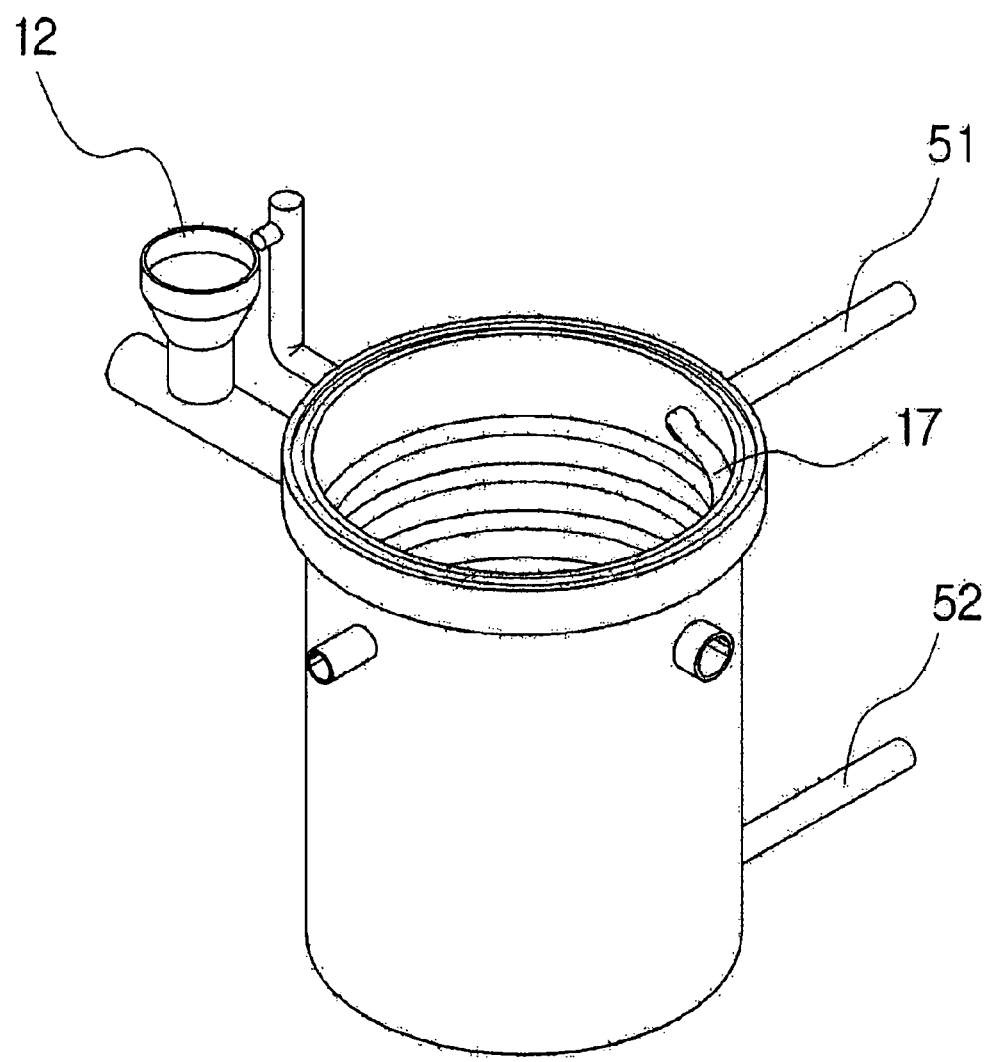
FIG. 2 is a perspective view illustrating a reaction vessel of FIG. 1.
Figure 3:
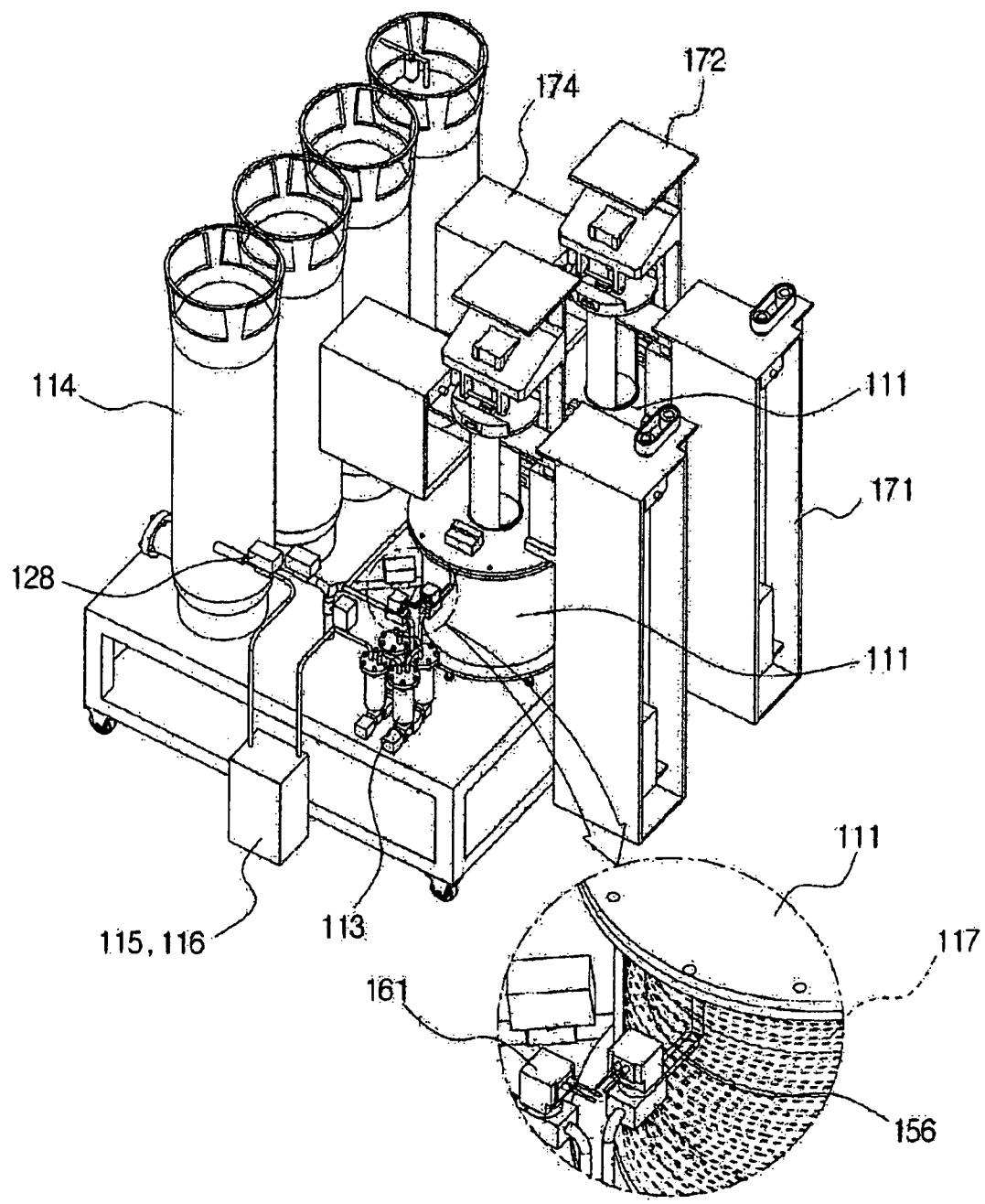
FIG. 3 is a perspective view illustrating an apparatus for generating hydrogen according to another embodiment of the present invention.
Figure 4:
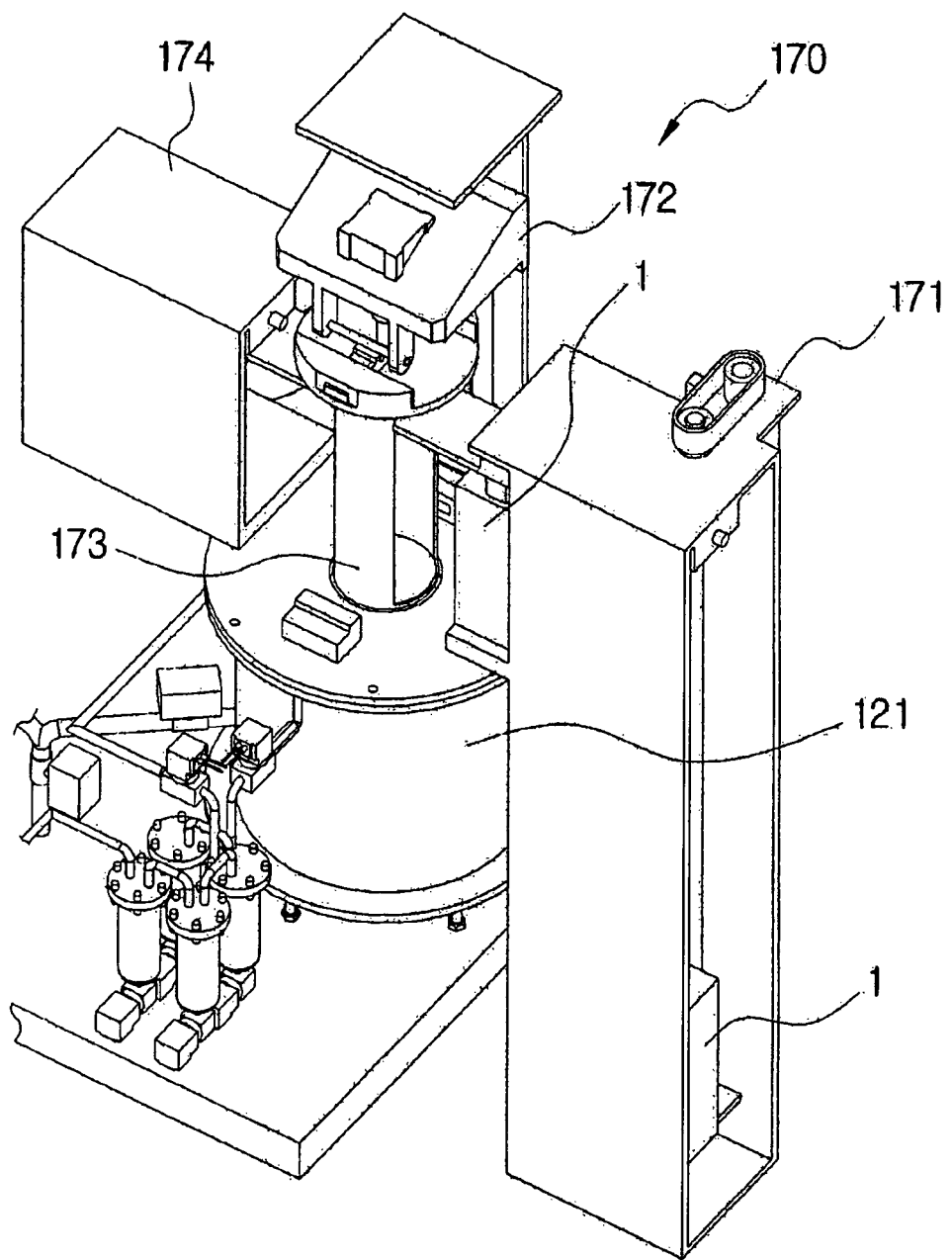
FIG. 4 is a perspective view illustrating an automatic supplier of FIG. 3.
Figure 5:
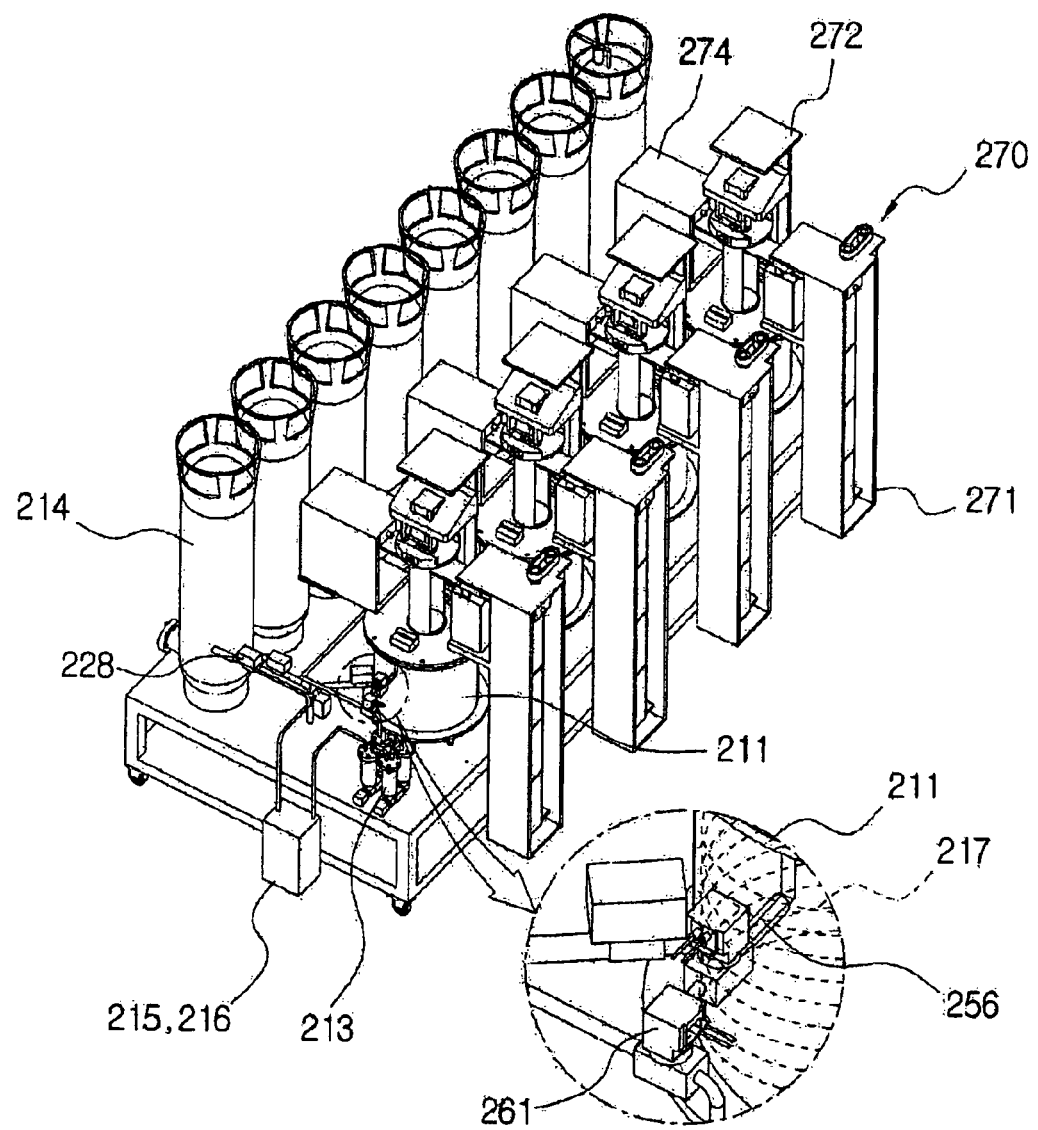
FIG. 5 is a perspective view illustrating an apparatus for generating hydrogen according to further another embodiment of the present invention.
Figure 6:
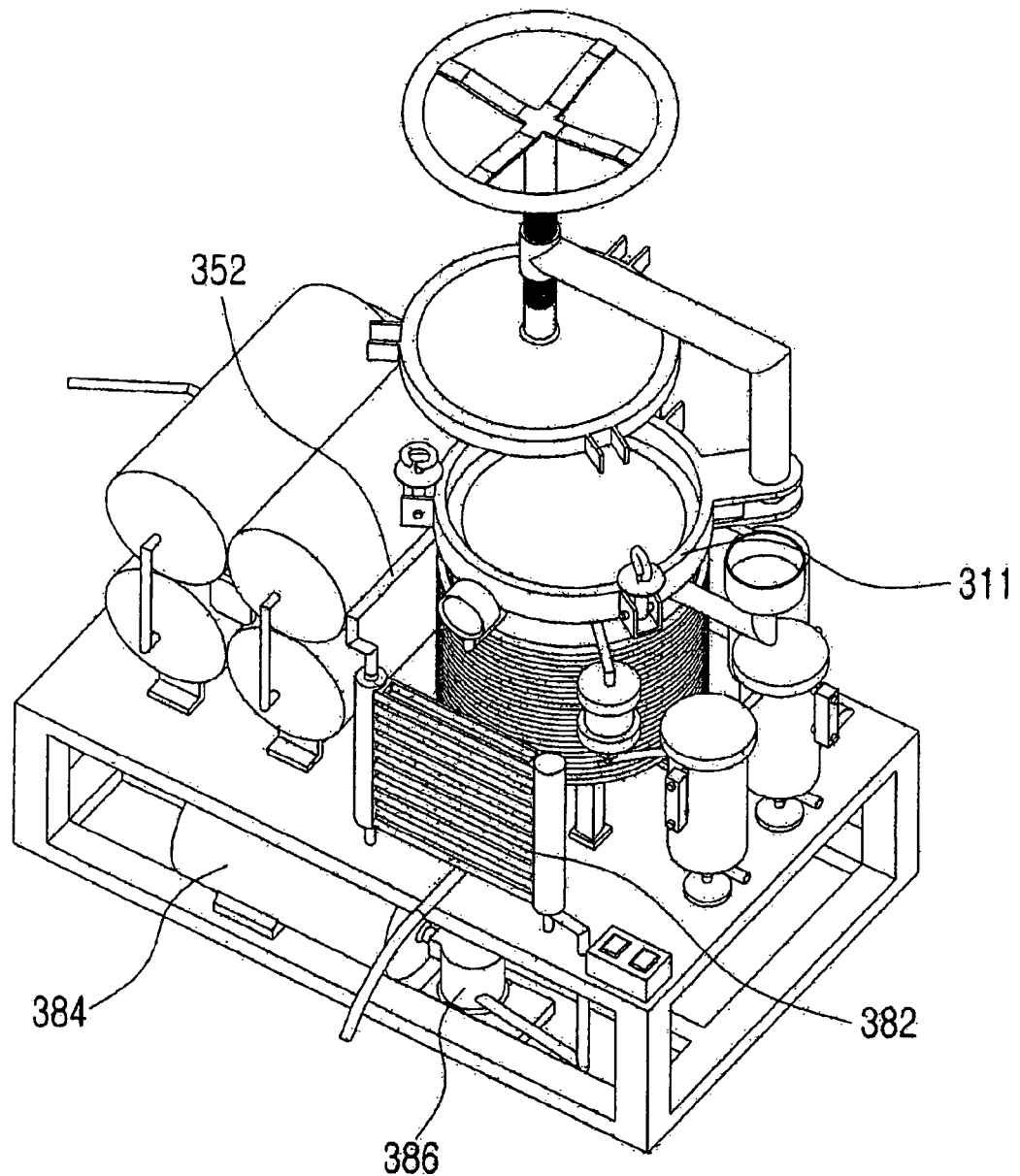
FIG. 6 is a perspective view illustrating an apparatus for generating hydrogen according to yet another embodiment of the present invention.

FIG. 1 is a perspective view illustrating an apparatus for generating hydrogen according to an embodiment of the present invention; FIG. 2 is a perspective view illustrating a reaction vessel of FIG. 1; FIG. 3 is a perspective view illustrating an apparatus for generating hydrogen according to another embodiment of the present invention; FIG. 4 is a perspective view illustrating an automatic supplier of FIG. 3; FIG. 5 is a perspective view illustrating an apparatus for generating hydrogen according to further another embodiment of the present invention; and FIG. 6 is a perspective view illustrating an apparatus for generating hydrogen according to yet another embodiment of the present invention.

Referring to FIG. 1, an apparatus for generating hydrogen according to an embodiment of the present invention includes a reaction vessel 11, a water supplying part 12, a hydrogen purifying part 13 and a hydrogen storing part 14.

Referring to FIG. 1, the reaction vessel 11 is a reactor in which the composition for generating hydrogen gas 1 (refer to FIG. 4) and water supplied from the water supplying part 12 react with each other to generate hydrogen gas. The reaction vessel 11 is provided with a heat exchange coil 17 therein and the heat exchange coil 17 is for recovering the reaction heat and thus controlling the reaction speed of the hydrogen gas generation reaction which is proceeded in an exothermic reaction. Meanwhile, the reaction vessel 11 may be provided with a temperature sensor (not shown) for measuring the temperature in the reaction vessel 11. Also, the reaction vessel 11 may be provided with a manometer 61, which is for measuring the pressure in the reaction vessel 11 due to vapor and hydrogen gas generated in the reaction vessel.

Referring to FIG. 2, the heat exchange coil 17 is connected with a cooling water supplying line 51 and a hot water discharging line 52. By utilizing hot water discharged through the hot water discharging line 52 in heating, etc., it is possible to utilize, without waste, the waste heat generated from the apparatus for generating hydrogen gas according to an embodiment of the present invention.

Meanwhile, though not shown in FIG. 1, the apparatus for generating hydrogen according to an embodiment of the present invention shown in FIG. 1 may be provided with an automatic composition supplier (not shown) for supplying the composition 1 (refer to FIG. 4) for generating hydrogen gas which is packed in a water permeable pouch to the reaction vessel 11.

Meanwhile, though not shown in the drawings, the apparatus for generating hydrogen according to an embodiment of the present invention shown in FIG. 1 may be provided with a control part (not shown). The control part (not shown) controls the amount of the cooling water supplied to the heat exchange coil 17 according to the temperature in the reaction vessel 11 which is inputted into the temperature sensor (not shown). Meanwhile, the control part (not shown) may control the amount of the cooling water supplied to the heat exchange coil 17 in consideration of the pressure in the reaction vessel 11 which is inputted into the manometer 61 together with the temperature. Preferably, the control part (not shown) operates to maintain the inside of the reaction vessel 11 to a temperature of from 30-150° C.

Referring to FIG. 1, the hydrogen gas generated from the reaction vessel 11 is discharged together with vapor and inputted into the hydrogen gas purifying part 13. The hydrogen gas purifying part 13 may include a water remover 13-1, an oxygen remover 13-2 and a hydrogen drier 13-3. The water remover 13-1 uses alkaline absorption method, and more specifically uses alkaline aqueous solution of potassium permanganate ($KMnO_4$) and 0.1N sodium hydroxide (NaOH) solution. The oxygen remover 13-2 uses a carbon molecular sieve as an oxygen scavenger and the hydrogen gas drier 13-3 which finally purifies the hydrogen gas uses a molecular sieve 5A or 13X.

Referring to FIG. 1, the hydrogen gas purified by the hydrogen purifying part 13 is discharged with high purity of more than 99.9% and the hydrogen gas discharged from the hydrogen purifying part 13 is stored in the hydrogen storing part 14 which is equipped with a high pressure vessel.

Referring to FIG. 1, in order to store the hydrogen gas discharged from the hydrogen purifying part 13 in the hydrogen storing part 14 with a pressure of more than atmospheric pressure, a hydrogen gas pressurizing part 15 is provided at a side of the hydrogen storing part 14. The hydrogen gas pressurizing part 15 is provided with a diaphragm pump (not shown) or a vacuum pump 16.

Meanwhile, high purity hydrogen gas can be effectively obtained only when air which is present within the apparatus for generating hydrogen gas according to the present invention is removed prior to the operation of the apparatus. In order to obtain high purity hydrogen gas of more than 99.99%, it is preferable that the inside of the apparatus maintains a vacuum state of more than $10^{-3}$ torr prior to the generation of the hydrogen gas. Table 1 below shows the purity of the hydrogen gas according to vacuum level of the apparatus for generating hydrogen gas according to an embodiment of the present invention shown in FIG. 1.

TABLE 1

Purity of hydrogen gas according to vacuum level

| Vacuum level | Purity of hydrogen gas Purity of hydrogen gas |
| --- | --- |
| Atmospheric pressure (1 atm) | 99% |
| $10^{-2}$ Torr | 99.50% |
| $10^{-3}$ Torr | 99.90% |
| $10^{-4}$ Torr | 99.95% |
| $10^{-5}$ Torr | 99.99% |
| $10^{-6}$ Torr | 99.99% |
| $10^{-7}$ Torr | 99.999% |

Reference numeral 56 denotes a downward check valve 56 for preventing a reverse flow of the hydrogen gas after the generation of the hydrogen gas.

FIG. 3 illustrates the apparatus for generating hydrogen gas according to another embodiment of the present invention, in which the reaction vessel 111 has a two-chamber system, and FIG. 5 illustrates the apparatus for generating hydrogen gas according to another embodiment of the present invention, in which the reaction vessel 111 has a four-chamber system. In the present invention, a number of the reaction vessel may be increased or decreased in the form of a module according to purpose of usage, amount of generation of hydrogen gas and amount of heat due to the use of waste heat. The embodiment shown in FIGS. 3 and 4 is provided with a downward check valve 156 or 256 for preventing a reverse flow of the hydrogen gas after the generation of the hydrogen gas, a pressure sensor 161 or 261 for detecting hydrogen gas pressure and a hydrogen purifying part 113 or 213 for purifying the hydrogen gas. Also, the embodiment shown in FIGS. 3 and 4 includes a hydrogen gas pressurizing part 115 or 215 which is provided with a vacuum pump 116 or 216. Using the vacuum pump 116 or 216, the hydrogen gas can be pressurized to about 10 atm and stored in a hydrogen storing part 114 or 214. The embodiment shown in FIGS. 3 and 4 is provided with a heat exchange coil 117 or 217 and the heat exchange coil 117 or 217 is placed in an inside of the reaction vessel 111 or 211.

FIG. 4 illustrates an automatic composition supplier 170. The automatic composition supplier 170 is for supplying the composition 1 for generating hydrogen gas which is packed in a water permeable pouch to the reaction vessel 11. The automatic composition supplier 170 includes a composition supplying part 171, a composition introducing and removing part 172, a composition receiving part 173 and a composition discharging part 174. The composition 1 for generating hydrogen gas is automatically supplied by the composition supplying part 171 and transferred to the composition receiving part 173 by the composition supplying part 171. The composition receiving part 173 is introduced into and removed from the inside of the reaction vessel 121 as the composition introducing and removing part 172 provided at an upper part of the reaction vessel 121 is lifted down and up.

Referring to FIGS. 3 and 4, a solenoid valve 128 is provided between the hydrogen gas storing part 114 and a pipeline of the vacuum pup 116 and the composition receiving part 173 is introduced into the inside of the reaction vessel 121 by the signal of the solenoid valve 128 and then the reaction occurs.

Referring to FIGS. 3 and 4, the composition 1 for generating hydrogen gas discharged from the reaction vessel 111 after the reaction is transported to the composition discharging part 174 and then discharged by a transportation device such as a conveyer belt (not shown), etc.

In FIG. 5, reference numeral 228 denotes a solenoid valve, 270 denotes an automatic composition supplier, 271 denotes a composition supplying part, 272 denotes a composition inputting part, and 274 denotes a composition discharging part. These are the same as or similar to those of the embodiment shown in FIG. 3.

Referring to FIG. 6, an apparatus for generating hydrogen gas according to yet another embodiment of the present invention may be provided with a radiator 382. The radiator 382 is connected to a heat exchange coil within a reaction vessel 311 through a hot water discharge line. The radiator 382 may be used for heating, etc. since hot water flows in the inside of the radiator 382. Meanwhile, a water circulation pump 396 may be connected to the radiator 382 and a water tank 384 is connected to the water circulation pump 396 so that the water circulates through the heat exchange coil and the radiator 382.

In addition, those skilled in the art can easily realize the parts not illustrated in detail in FIGS. 1 to 6 based on the principle of the apparatus for generating hydrogen gas.

Experimental Example 1

A composition for generating hydrogen gas was prepared from 60 g of calcium oxide powder (40-325 mesh, purity 95 weight %), 5 g of anhydrous calcium chloride, 20 g of aluminum and 5 g of iron and packed with nonwoven fabric of a pouch form.

The prepared pouch was put into the reaction vessel and then 250 g of water was slowly added thereto, thereby generating hydrogen gas.

Experimental Example 2

Cataloid-AP1 (Zeus Chemtech Co., Ltd., Korea) was used as a reaction accelerator. A pouch of the composition for generating hydrogen gas was prepared by mixing 70 g of calcium oxide and 20 g of calcium chloride or 20 g of sodium bicarbonate and 10 g of Cataloid-AP1 and put into the reaction vessel. Then, 250 g of water was slowly added thereto, thereby generating hydrogen gas.

Experimental Example 3

The same as Experimental Example 2, except that Cataloid-AP3 (Zeus Chemtech Co., Ltd., Korea) was used in place of Cataloid-AP1.

Experimental Example 4

A composition for generating hydrogen gas was prepared from 50 g of aluminum powder (50 weight %), 10 g of calcium oxide powder (10 weight %), 37 g of dolomite powder (37 weight %) and 3 g of sodium hydroxide powder (3 weight %) and packed with nonwoven fabric of a pouch form.

The prepared pouch was put into the reaction vessel and then 250 g of water was slowly added thereto, thereby generating hydrogen gas.

Experimental Example 5

A composition for generating hydrogen gas was prepared from 25 g of aluminum powder (25 weight %), 25 g of magnesium powder (25 weight %), 10 g of calcium oxide powder (10 weight %), 37 g of dolomite powder (37 weight %) and 3 g of sodium hydroxide powder (3 weight %) and packed with nonwoven fabric of a pouch form.

The prepared pouch was put into the reaction vessel and then 250 g of water was slowly added thereto, thereby generating hydrogen gas.

Experimental Example 6

A composition for generating hydrogen gas was prepared from 20 g of aluminum powder (20 weight %), 20 g of magnesium powder (20 weight %), 10 g of iron powder (10 weight %), 10 g of calcium oxide powder (10 weight %), 37 g of dolomite powder (37 weight %) and 3 g of sodium hydroxide powder (3 weight %) and packed with nonwoven fabric of a pouch form.

The prepared pouch was put into the reaction vessel and then 250 g of water was slowly added thereto, thereby generating hydrogen gas.

In case of conventional composition, since the calcium hydroxide generated in the process of the hydrogen generation is generated on surface of the calcium oxide and thus water cannot infiltrate effectively into the inside of the calcium oxide, there was a problem that the hydrogen generation speed is slowed down with lapse of time. However, in the composition for generating hydrogen gas used in Experimental Examples 1-3, it could be confirmed that the hydrogen gas generation speed is fast as compared with conventional composition and controllable, and the hydrogen gas is continuously and sufficiently generated as the vapor infiltrates into the calcium oxide.

INDUSTRIAL APPLICABILITY

According to the present invention described above, since it is possible to generate hydrogen alone by spontaneous thermochemical reaction without supplying electricity, it is possible to realize portable and fixed hydrogen generators. Further, since production cost can be reduced compared with conventional hydrogen gas generation method, it is possible to utilize to a non-ignitable catalyst heater using the hydrogen or a non-ignitable hydrogen boiler. Furthermore, it is an effective solution for reducing emission of greenhouse gases as one of alternative energies. In addition, in relation to the field of a fuel cell, it is be expected to be utilized as a hydrogen supplying apparatus for small, medium and large fuel cells by using hydrogen as fuel.

The invention claimed is:

1. An apparatus for generating hydrogen gas using a composition for generating hydrogen gas, the apparatus comprising:
    a reaction vessel which receives a composition for generating hydrogen gas by contacting with water at room temperature and is provided with a heat exchange coil for recovering reaction heat;
    a water supplying part provided with a sprayer for spraying water to the composition for generating hydrogen gas within the reaction vessel;
    a hydrogen purifying part for purifying the hydrogen gas generated from the reaction vessel; and
    a hydrogen storing part for storing the hydrogen gas pressurized by a hydrogen gas pressurizing part, and
    wherein the composition for generating hydrogen comprises:
    40-70 weight % of calcium oxide (CaO) powder;
    2-20 weight % of calcium chloride ($CaCl_2$), magnesium chloride ($MgCl_2$) or sodium bicarbonate ($NaHCO_3$) powder;
    6.7- 30 weight % of aluminum or alumina ($Al_2O_3$) powder; and
    0.001- 10 weight % of iron or magnesium powder,
    wherein alumina of the alumina powder is a spherical, flat, or fibrous porous alumina prepared from a sol-gel reaction.

2. The apparatus for generating hydrogen gas using a composition for generating hydrogen gas as set forth in claim 1, wherein a temperature sensor is provided within the reaction vessel and a control part for controlling amount of water supplied to the heat exchange coil in response to a temperature inputted into the temperature sensor.

3. The apparatus for generating hydrogen gas using a composition for generating hydrogen gas as set forth in claim 2, wherein the temperature of the reaction vessel is controllably maintained to 30- 150° C.

4. The apparatus for generating hydrogen gas using a composition for generating hydrogen gas as set forth in claim 3, wherein the hydrogen gas pressuring part, is provided between the hydrogen gas purifying part and the hydrogen gas storing part.

5. The apparatus for generating hydrogen gas using a composition for generating hydrogen gas as set forth in claim 4, wherein the hydrogen gas pressuring part is provided with at least one selected from a diaphragm pump and a vacuum pump.

6. The apparatus for generating hydrogen gas using a composition for generating hydrogen gas as set forth in claim 5, wherein the hydrogen gas purifying part passes through at least one selected from a water remover, an oxygen remover and a hydrogen gas drier.

7. The apparatus for generating hydrogen gas using a composition for generating hydrogen gas as set forth in claim 6, wherein the hydrogen gas drier is a molecular sieve 5A or 13X.

8. The apparatus for generating hydrogen gas using a composition for generating hydrogen gas as set forth in claim 3, wherein the composition for generating hydrogen gas is packed in a water permeable pouch.

9. The apparatus for generating hydrogen gas using a composition for generating hydrogen gas as set forth in claim 8, further comprising an automatic composition supplier for supplying the water permeable pouch, which contains the composition for generating hydrogen gas, to the reaction vessel.

10. The apparatus for generating hydrogen gas using a composition for generating hydrogen gas as set forth in claim 9, wherein the automatic composition supplier includes:
   a composition receiving part which receives the composition for generating hydrogen gas and is introduced into and removed from the reaction vessel;
   a composition supplying part for transporting the composition for generating hydrogen gas to the composition receiving part;
   a composition introducing and removing part which is provided at an upper part of the reaction vessel and lifts up and down the composition receiving part, thereby letting the composition receiving part introduced into and removed from the reaction vessel; and
   a composition discharging part for discharging the composition for generating hydrogen gas from the composition receiving part to the outside.

11. The apparatus for generating hydrogen gas using a composition for generating hydrogen gas as set forth in claim 3, further comprising a vacuum pump for removing air from an inside of the apparatus for generating hydrogen gas.

12. The apparatus for generating hydrogen gas using a composition for generating hydrogen gas as set forth in claim 3, further comprising:
   a radiator connected to the heat exchange coil to let water discharged from the heat exchange coil flow out;
   a water circulation pump connected to the radiator; and
   a water tank connected to the water pump.

* * * * *